United States Patent
Coden et al.

(10) Patent No.: US 7,676,358 B2
(45) Date of Patent: Mar. 9, 2010

(54) SYSTEM AND METHOD FOR THE RECOGNITION OF ORGANIC CHEMICAL NAMES IN TEXT DOCUMENTS

(75) Inventors: Anna Rosa Coden, Riverdale, NY (US); James William Cooper, Wilton, CT (US)

(73) Assignee: International Business Machines Corporation, Armonk, NY (US)

(*) Notice: Subject to any disclaimer, the term of this patent is extended or adjusted under 35 U.S.C. 154(b) by 1010 days.

(21) Appl. No.: 10/670,675

(22) Filed: Sep. 24, 2003

(65) Prior Publication Data

US 2005/0065776 A1    Mar. 24, 2005

(51) Int. Cl.
*G06F 17/28* (2006.01)

(52) U.S. Cl. .......................................... 704/4
(58) Field of Classification Search .................. 704/4
See application file for complete search history.

(56) References Cited

U.S. PATENT DOCUMENTS

| | | | | |
|---|---|---|---|---|
| 5,950,192 | A * | 9/1999 | Moore et al. | 707/3 |
| 6,098,034 | A * | 8/2000 | Razin et al. | 704/9 |
| 6,304,869 | B1 | 10/2001 | Moore et al. | 707/3 |
| 6,732,090 | B2 * | 5/2004 | Shanahan et al. | 707/3 |
| 6,823,301 | B1 * | 11/2004 | Ishikura | 704/9 |
| 6,963,830 | B1 * | 11/2005 | Nakao | 704/1 |
| 7,054,754 | B1 * | 5/2006 | Brecher | 702/19 |
| 2002/0087508 | A1 | 7/2002 | Hull et al. | 707/1 |
| 2002/0169755 | A1 * | 11/2002 | Framroze et al. | 707/3 |
| 2005/0108001 | A1 * | 5/2005 | Aarskog | 704/10 |
| 2005/0131025 | A1 * | 6/2005 | Matier et al. | 514/326 |

OTHER PUBLICATIONS

Wilbur, et al., "Analysis of biomedical text for chemical names: a comparison of threee methods", Proc. AMIA Symp. 1999, Washington, 1999, 3 pgs.

(Continued)

*Primary Examiner*—David R Hudspeth
*Assistant Examiner*—Jakieda R Jackson
(74) *Attorney, Agent, or Firm*—Harrington & Smith

(57) ABSTRACT

This invention provides a method, a system and a computer program for recognizing technical terms. In the preferred embodiment the technical terms are chemical names, and in a most preferred embodiment the technical terms are organic chemical names. A computer program product stores in a computer readable form a set of computer program instructions for directing at least one computer to process a text document. The set of computer program instructions include instructions for assigning corresponding associated parts of speech to words found in the document. The instructions for assigning include instructions to apply a plurality of regular expressions, rules and a plurality of dictionaries to recognize organic chemical name fragments, to combine recognized organic chemical name fragments into a complete organic chemical name, and to assign the complete organic chemical name with one part of speech. The regular expressions include a plurality of patterns, individual ones of which are comprised of at least one of characters, numbers and punctuation. For example, the punctuation can comprise at least one of parenthesis, square bracket, hyphen, colon and semicolon, and the characters can comprise at least one of upper case C, O, R, N and H, and further comprise strings of at least one of lower case xy, ene, ine, yl, ane and oic.

31 Claims, 15 Drawing Sheets

OTHER PUBLICATIONS

Narayanaswamy, et al., "A Biological Named Entity Recognizer", Proceedings of the Pacific Symposium on Biocomputing, Jan. 2003, 12 pgs.

Wilbur, et al., (W.J. Wilbur, G.F. Hazard, G. Divita, J..G. Mork, A.R. Aronson and A.C. Browne, "Analysis of biomedical text for chemical names: a comparison of threee methods", in Proc. AMIA Symp. 1999, Washington, 1999, 5 pgs.

M. Narayanaswamy, E. Ravikumar and K. Wijay-Shaker, "A Biological Named Entity Recognizer", Proceedings of the Pacific Symposium on Biocomputing, Jan. 2003, 12 pgs.

Eugene Garfield, "An Algorithm for Translating Chemical Names to Molecular Formulas", Essays of an Information Scientist, vol. 7, p. 441-515, 1984.

"Smiles Parser", http://www.wag.caltech.edu/home/meulbroek/smiles/smiles_parser.htm, Feb. 24, 2004, 2 pgs.

"Smiles Specification", http://umbbd.ahc.umn.edu/core/SMILES.html, Feb. 24, 2004, 1 pg.

P.G. Dittmar, N.A. Farmer, W. Fisanick, R.C. Haines and J. Mockus, "The CAS Online Search System. 1. General System Design and Selection, Generation, and Use of Search Screens", J. Chem. Inf. Comput. Sci. 1983 vol. 23, No. 3, Oct. 8, 1982, pp. 93-102.

Nick Kemp and Michael Lynch, "Extraction of Information from the Text of Chemical Patents. 1. Identification of Specific Chemical Names", J. Chem. Inf. Comput. Sci. 1998, vol. 38, No. 4, Jan. 6, 1998, pp. 544-551.

Niranjan G. Shivaratri, Phillip Krueger and Singhal, "Load Distributing for Locally Distributed Systems", IEEE, Dec. 1992, pp. 33-44.

Axel Drefahl and Martin Reinhard, "Similarity-Based Search and Evaluation of Environmentally Relevant Propereties for Organic Compounds in Combination with the Group Contribution Approach", J. Chem. Inf. Comput. Sci. 1993, vol. 33, No. 6, Feb. 17, 1993, pp. 886-895.

Don P. Leiter, Jr., Harry L. Morgan and Robert E. Stobaugh, "Installation and Operation of a Registry for Chemical Compounds", Journal of Chemical Documentation, Jul. 7, 1965, pp. 238-241.

* cited by examiner

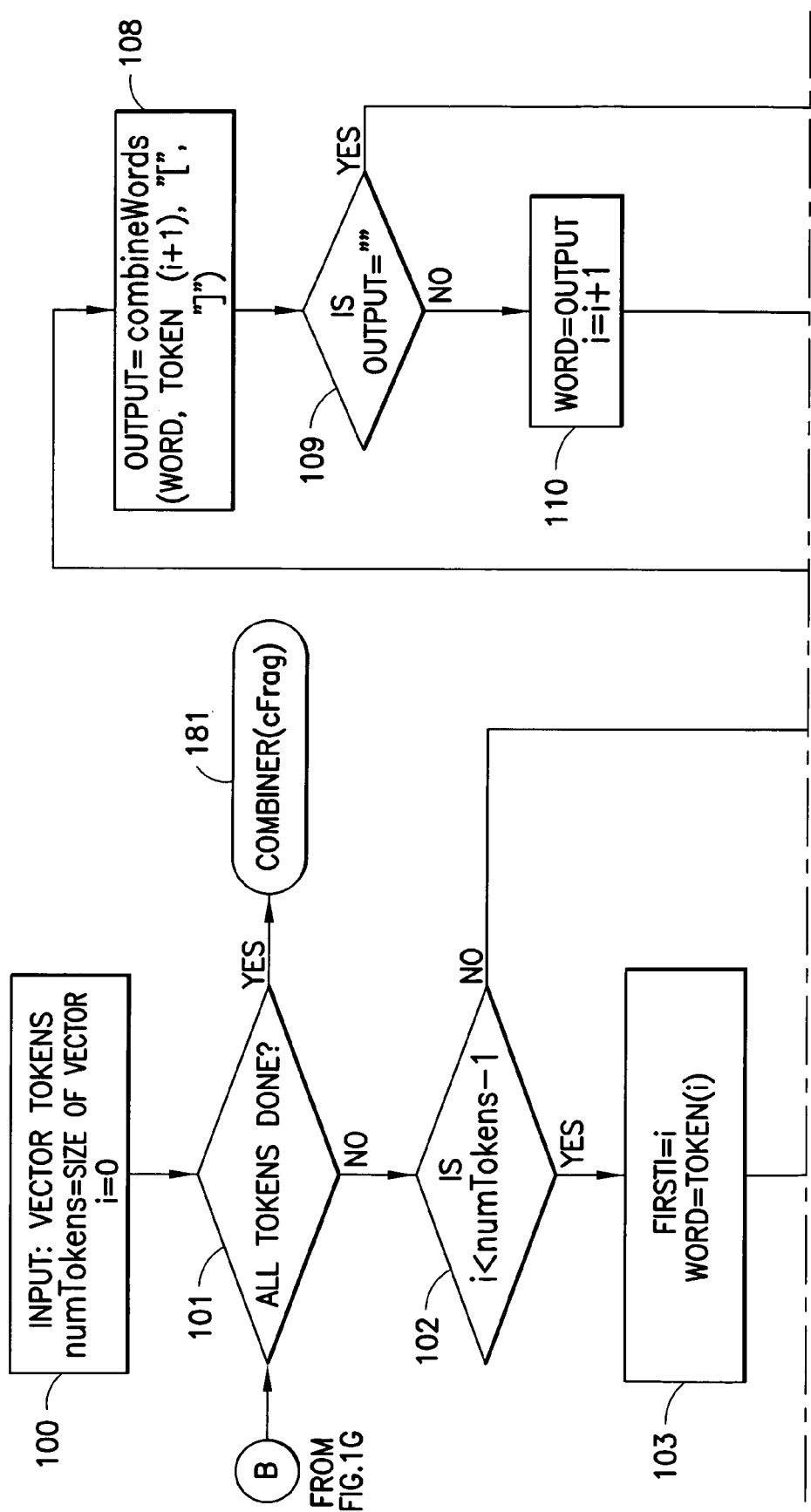

CHECK MATCHING PARENTHESIS combineWords(String s, String t, String p0, String pe)

eliminate (String word)

cleanUp(String s)

Combiner(Vector frag)

SYSTEM AND METHOD FOR THE RECOGNITION OF ORGANIC CHEMICAL NAMES IN TEXT DOCUMENTS

TECHNICAL FIELD

This invention relates in general to digital libraries and life science documents and, more specifically, it relates to apparatus and methods for searching and analyzing scientific documents, such as journal publications and patents, for the occurrence of names of organic chemicals.

BACKGROUND

Regardless of the technology being used, most system for the analysis and indexing of documents for search and information retrieval follow the same basic procedure. First the data are separated into individual documents and each document is divided into text tokens. These tokens are then combined into meaningful phrases and fragments that are indexed for retrieval. An index contains data that is used for search and document analysis to process queries and identify relevant objects. After the index is constructed, queries may be submitted to the search system. The query represents information that is desired by the user, and is expressed using a query language and syntax defined by the search system. The search system processes the query using the index data for the database and a suitable similarity ranking algorithm. From this, the system returns a list of topically relevant objects, often referred to as a "hit-list". The user may then select relevant objects from the hit-list for viewing and processing.

In a network environment, the components of a text search system may be distributed across multiple computers. A network environment contains two or more computers connected by a local or a wide area network, (e.g., Ethernet, Token Ring, the telephone network, and the Internet). A user accesses a hypermedia object database using a client application on the user's computer. The client application communicates with a search server (e.g., a hypermedia object database search system) on either the computer (e.g., the client) or another computer (e.g., one or more servers) on the network. To process queries, the search server needs to access just the database index, which may be located on the same computer as the search server or on another computer on the network. The actual objects in the database may be located on any computer on the network.

A Web environment, such as the World Wide Web on the Internet, is a network environment where Web servers and browsers are used. Having gathered and indexed all of the documents available in the collection, the index can then be used, as described above, to search for documents in the collection. Again, the index may be located independently of the objects, the client, and even the search server. A hit-list, generated as the result of searching the index, will typically identify the locations and titles of the relevant documents in the collection, and the user then retrieves those documents directly using the user's Web browser.

Text mining of documents can also be performed as part of document indexing. Text mining involves the recognition of document parts, such as paragraphs and sentences, and then the analysis of each recognized document part (e.g., each sentence). Sentence analysis involves the tagging of each word with its part of speech and then the parsing of each sentence into its component parts. The result of sentence parsing is a parse tree of the parts and sub-parts of that sentence. This information is typically stored in tables for retrieval. Frequently these tables are database tables with database indexes associated with them.

Such parsing and data storage can then be used to deduce the overall meaning of the document and the relations between parts of the document.

Of particular concern to this invention is the above-described sentence parsing operation, in the context of documents that contain the names of organic chemicals. Organic chemical names can be made up of very long strings of words, punctuation and spaces which need to be grouped so that they can be recognized as single noun phrases, rather than as a series of unknown words.

Organic chemical terms can be lengthy, complex, and may consist of several words separated by spaces. Ideally, an organic chemical term should be recognized as a single noun phrase for the parsing of sentences in technical documents to proceed effectively. For example, terms such chloroacetic acid, 4-allyl-2,6-dimethylphenol, 5-aminoalkyl-pyrazolo [4,3-D]-pyrimidine and 4-nitrobenzyl chloroformate each present specific term recognition challenges. A prior art approach to solving this recognition problem would be to provide, maintain and reference a very large chemical dictionary to identify the presence of organic chemical terms appearing as part of a document text.

Further, while there exist specific rules for the spelling, spacing and punctuation of such chemical terms, these rules are not always rigorously followed, especially in the patent literature. Examples abound of chemical names broken up by incorrect spaces or hyphens which must be recombined for the overall term to be recognized successfully.

Wilbur, et. al. (W. J Wilbur, G. F. Hazard, G. Divita, J. G. Mork, A. R. Aronson and A. C. Browne, "Analysis of biomedical text for chemical names: a comparison of three methods," in Proc. AMIA Symp. 1999, Washington, 1999) described three algorithms for the discovery of chemical names in biomedical text. The first is an analysis of the structure of chemical names into a set of chemical morphemes, and then the combination of these morphemes into chemical names. The other two methods are variations on a Bayesian classifier based on overlapping n-grams. These methods were tested, however, on well edited text, and it is thus not clear how they would perform in light of errors. In addition, Wilbur, et al. specifically note that they only recognized chemical names found in the MeSH ontology, and that names containing punctuation characters would not work well with their algorithms.

M. Narayanaswamy, E. Ravikumar and K. Vijay-Shaker, "A Biological Named Entity Recognizer," Proceedings of the Pacific Symposium on Biocomputing, January, 2003 disclosed a system for recognizing a small set of chemical phrases that may be part of common biological abbreviations, but did not extend their procedure to the general case of interest to this invention.

Prior to this invention, there existed no satisfactory document search and text mining apparatus or methods for dealing with documents containing chemical names, such as the names of organic chemicals.

SUMMARY OF THE PREFERRED EMBODIMENTS

The foregoing and other problems are overcome, and other advantages are realized, in accordance with the presently preferred embodiments of these teachings.

This invention provides a method, a system and a computer program for recognizing technical terms. In the preferred embodiment the technical terms are chemical names, and in a most preferred embodiment the technical terms are organic chemical names.

In one aspect this invention provides a system and a method to identify organic chemical nomenclature from text documents. In many cases this implies the grouping of multi-word entities into a single logical entity. The text documents can be either well edited (the rules for denoting such entities are followed) or ill formed, and the system and method may be applied to both types of documents. Furthermore, only two small dictionaries of common chemical prefixes and common chemical suffixes are used. An optional dictionary of "stop words" may also be used to eliminate erroneous chemical fragments.

The system and method in accordance with this invention employs a series of regular expressions, rules, and the small dictionaries to recognize chemical name fragments and combine them into organic chemical names. The use of this invention is valuable in assisting parsers in recognizing multi-word chemical names that might otherwise be recognized as small fragments separated by punctuation that is part of these chemical names. When the recognition is carried out ahead of parsing, the results of the parsing are made more accurate.

In one aspect this invention provides a method to process a document. The method includes partitioning document text into a plurality of sentences; for each sentence, assigning corresponding associated parts of speech to words, where assigning comprises applying a plurality of regular expressions, rules and a plurality of dictionaries to recognize chemical name fragments, to combine recognized chemical name fragments into a complete chemical name, and to assign the complete chemical name with one part of speech; and parsing the sentence into its component parts based at least in part on the assigned parts of speech.

In a further aspect this invention provides a system for processing a text document. The system includes a first unit for partitioning document text into a plurality of sentences; a second unit, operable for each sentence, for assigning corresponding associated parts of speech to words, said second unit comprising sub-units to apply a plurality of regular expressions, rules and a plurality of dictionaries to recognize chemical name fragments, to combine recognized chemical name fragments into a complete chemical name, and to assign the complete chemical name with one part of speech; and a third unit for parsing sentences into component parts based at least in part on the assigned parts of speech.

In a still further aspect this invention provides a computer program product for storing in a computer readable form a set of computer program instructions for directing at least one computer to process a text document. The set of computer program instructions include instructions for assigning corresponding associated parts of speech to words found in the document, where said instructions for assigning include instructions to apply a plurality of regular expressions, rules and a plurality of dictionaries to recognize organic chemical name fragments, to combine recognized organic chemical name fragments into a complete organic chemical name, and to assign the complete organic chemical name with one part of speech. The regular expressions include a plurality of patterns, individual ones of which are comprised of at least one of characters, numbers and punctuation. For example, the punctuation can comprise at least one of parenthesis, square bracket, hyphen, colon and semi-colon, and the characters can comprise at least one of upper case C, O, R, N and H, and further comprise strings of at least one of lower case xy, ene, ine, yl, ane and oic.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 1, composed of FIGS. 1A-1G, illustrates the overall flow of the recognition algorithm;

FIG. 2 shows the testing for matching parentheses;

FIG. 3 illustrates a method for combining words into larger phrases;

FIG. 4 depicts how words are eliminated from consideration;

FIG. 5 illustrates how strings are cleaned of training punctuation; and

FIG. 6, composed of FIGS. 6A and 6B, shows how fragments are combined into larger phrases; and where

DETAILED DESCRIPTION OF THE PREFERRED EMBODIMENTS

When mining information from text documents, such as patents and technical articles, it is important that lengthy multi-word organic chemical nomenclatures be recognized properly so that they can be grouped as single logical entities. This improves the parsing of the sentence in which they are enclosed, and thus the ability of text mining software to extract meaning from such documents. This invention addresses this need by providing a system, a method and a computer program product for grouping such nomenclature into logical entities, without the need to provide a large chemical dictionary or dictionaries.

The inventors have realized that a preponderance of organic chemical names can be recognized using a small set of regular expressions, a set of rules, and two dictionaries of common chemical terms. The two dictionaries can each be significantly smaller than the large dictionary or dictionaries of chemical names that would be required using prior art approaches. Furthermore, a small set of rules have been found to describe the combination of the common chemical words, with the strings identified by syntactic rules.

In the presently preferred embodiment the name recognition algorithm is applied to organic chemical names, as most inorganic chemical names may be easily identified with a small dictionary of the names of elements, salts and prefixes. However, it should be noted at the outset that the use of this invention is not limited to only the identification of organic chemical names, or to only the identification of chemical names.

The preferred method can be characterized as having two basic steps: recognizing candidate chemical fragments separated by spaces, and combining these fragments into larger entities. To determine whether a token is a chemical fragment both its syntax and its context are be taken into account. Furthermore, the method, system and computer program product handles chemical fragments that are written not following the standard rules of writing such entities, or which contain erroneous spaces and characters caused by, for example, the use of optical character recognition (OCR) software that introduces spaces caused by linebreaks.

Recognizing Organic Chemical Fragments

In the following discussion the algorithms used for recognizing organic chemical names are described. The use of these algorithms results in a more accurate parse of sentences within a document, making it possible to deduce noun phrases and relations between them more accurately.

Figure 7:
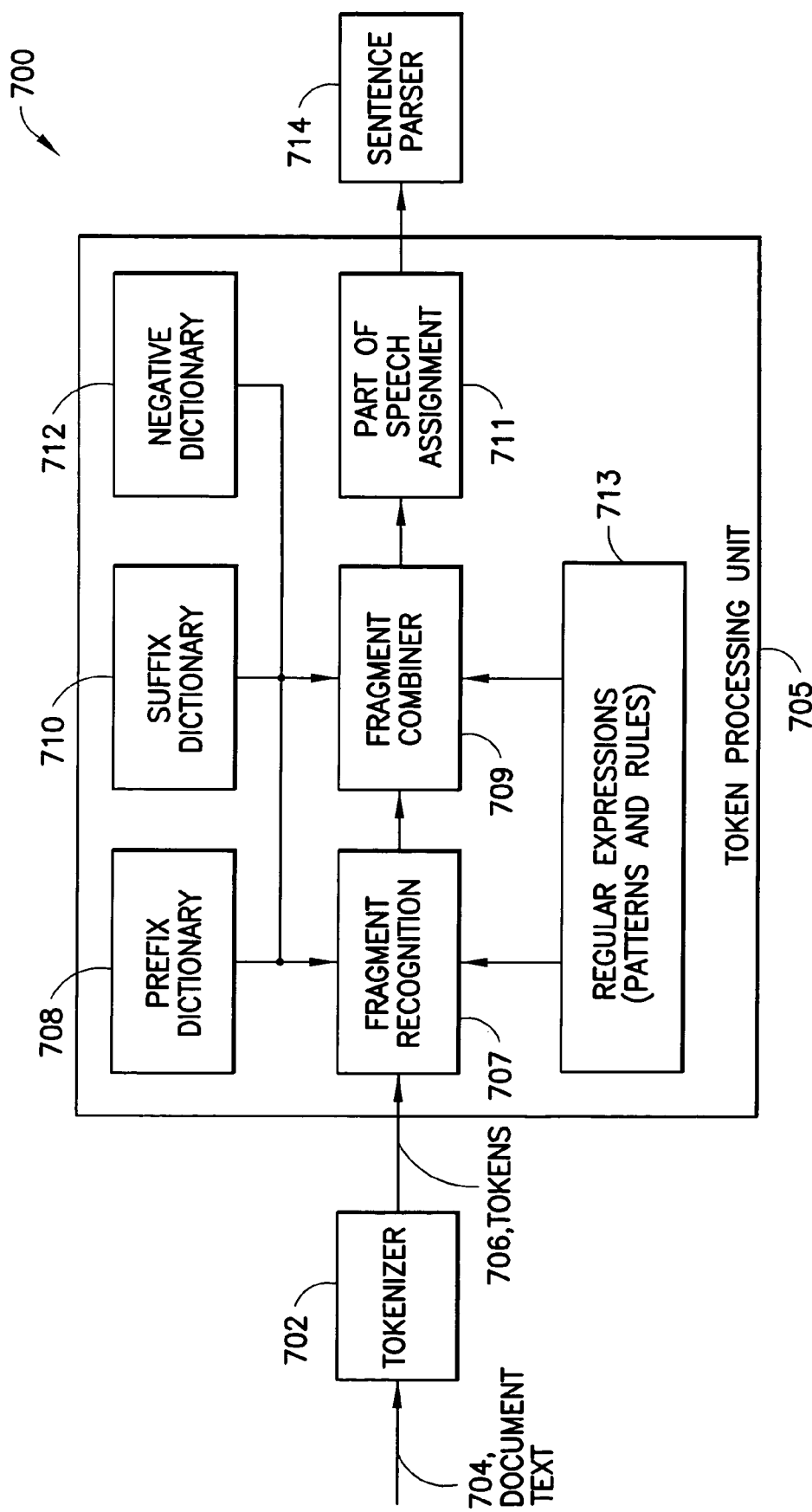
FIG. 7 is a block diagram of an exemplary embodiment of a computer system that is suitable for practicing the method of this invention.

Referring to FIG. 7, it is assumed that a system 700 contains a standard tokenizer 702 for separating input document text 704 into tokens 706 based on blank spaces. The tokens 706 are examined where they match a set of defined patterns. Furthermore the tokens 706 are examined in the context of the adjacent tokens, to determine whether the tokens 706 are part of a chemical fragment. More specifically, the system 700 includes a token processing unit 705 for assigning corresponding associated parts of speech to words found in the document. The token processing unit 705 that is constructed in accordance with this invention to include sub-units 707, 709 and 711 for applying a plurality of regular expressions and rules, and a plurality of dictionaries, to recognize organic chemical name fragments (sub-unit 707), for combining recognized organic chemical name fragments into a complete organic chemical name (sub-unit 709), and for assigning the complete organic chemical name with one part of speech, preferably a noun (sub-unit 711). The aforementioned dictionaries of the system 700 include a prefix dictionary 708 (containing a list of common prefixes for the technical terms of interest), a suffix dictionary 710 (containing a list of common suffixes for the technical terms of interest), and an optional negative dictionary 712. The negative dictionary 712, if used, contains words that may occur within the input document text 704, but that do not form a meaningful part of a technical term (e.g., do not form a part of an organic chemical compound). Basically, the negative dictionary 712 includes a list of words that can be ignored. Examples of words that may be found in the negative dictionary 712 are "saline" and "formula". The negative dictionary 712 is used by a word elimination routine described in FIG. 4. It should be appreciated that the contents of the dictionaries 708, 710 and 712 can change and evolve over time, and over the use of the system 700, either manually or automatically. The plurality of regular expressions (patterns) and rules can be stored in a database 713, and may also change and evolve over time, and over the use of the system 700, either manually or automatically. The output of the token processing unit 705 can form an input to a further unit 714 that parses sentences into their component parts based at least in part on the assigned parts of speech (including the noun part of speech assigned to recognized organic chemical names in accordance with this invention).

Patterns Used by the Algorithm

A set of character patterns (regular expressions) are now described:

1) BracketPattern—a pattern that starts and ends with a square bracket and contains at least a single character between the brackets,
2) ParenthesisPattern—a pattern containing at least two open parenthesis,
3) HyphenPattern1—a pattern containing at least two hyphens and at least one single digit before the first hyphen,
4) HyphenPattern2—a pattern containing at least two hyphens and at least one single digit between the first and the second hyphen,
5) HyphenPattern3—a pattern containing at least two hyphens and at least one single digit after the last hyphen,
6) HyphenPattern4—a pattern containing a hyphen and a comma, where the hyphen precedes the comma,
7) HyphenPattern5—a pattern containing a comma and a hyphen, where the comma precedes the hyphen,
8) HyphenPattern6—a pattern that starts with one or more groups of a single digit, followed by an apostrophe, followed by a comma, followed by a group consisting of a single digit followed by an apostrophe, followed by any character,
9) SingleLetterPattern—a pattern that is either the capitalized letter C or the capitalized letter R,
10) CommaPattern—a pattern containing more than one comma,
11) CommaApostrophePattern—a pattern that starts with one or more letters, followed by one or more numbers, followed by either a comma or an apostrophe and that ends with a letter,
12) NumberPattern1—a pattern having three groups of digits separated by comma,
13) NumberPattern2—a pattern that is either a single or double digit number,
14) PunctPattern1—a pattern containing a plus followed by a forward slash (\),
15) PunctPattern2—a pattern that starts with zero or more capital letters, followed by two hyphens, followed by zero or more capital letters and that ends with zero or more characters,
16) PunctPattern3—a pattern containing a colon,
17) PunctPattern4—a pattern that starts with one or more digits and that ends with a hyphen,
18) PunctPattern5—a pattern that has one or two double hyphens,
19) PunctPattern6—a pattern starting with a hyphen, followed by any number of characters, followed by at least one digit and ending with zero or more characters,
20) PunctPattern7—a pattern containing at least one open parenthesis,
21) PunctPattern8—a pattern that starts with zero or more occurrences of capital letters, lowercase letters, digits, hyphens and commas, followed by a closed parenthesis, and ending with zero or more occurrences of capital letters, lowercase letters, digits, hyphens and commas,
22) PunctPattern9—a pattern starting with zero or more capital letters, followed by an open parenthesis, followed by zero or more capital letters, zero or more digits, a hyphen, zero or more capital letters, and zero or more digits,
23) PunctPattern10—a pattern starting with zero or more lower case patterns, followed by zero or more hyphens, followed by zero or more lowercase letters, a closed bracket, zero or more hyphens and at least one more character,
24) PunctPattern11—a pattern starting with an open parenthesis, followed by one or more digits, a closed parenthesis, a bracket, a hyphen, zero or more closed brackets, an open parenthesis, one or more digits and a closed parenthesis,
25) PunctPattern12—a pattern starting with zero or more lowercase letters, followed by an open parenthesis, one or more lowercase letters, a closed parenthesis, and ending with zero or more lowercase letters,
26) PunctPattern13—a pattern ending with an open square bracket followed by one or more digits,
27) PunctPattern14—a pattern containing a semicolon,
28) LetterPattern1—a patterns that starts with a capital R, followed by one or two digits, followed by zero or more letters either lowercase or capitalized,
29) LetterPattern2—a pattern consisting of all lower case letters, 30) LetterPattern3—a pattern that starts with a capital C, followed by an open parenthesis, followed by zero or more characters, 31) LetterPattern4—a pattern that starts with zero or more open parenthesis, followed by either a capital C, O, R, N, H, followed by zero or more open parenthesis, followed by zero or more occurrences of C, O, R, N, H, followed by zero or more closed parenthesis, followed by a single digit, 32) LetterPattern5—a pattern starting with zero or more open parenthesis, followed by the capital letter C, followed by either one or two digits, followed by zero or more closed parenthesis, followed by one or more groupings of a hyphen and a lowercase letter, 33) LetterPattern6—a pattern starting with zero or more capital letters, followed by the letters CH, followed by zero or more digits, followed by zero or more capital letters, followed by zero or more occurrences of the letters Ph, followed by zero or more capital letters, 34) LetterPattern7—a pattern starting with an open parenthesis followed by a one or more lower case letters, 35) NumberPattern1—a pattern starting with an open parenthesis, followed by zero or more digits and ending with a closed parenthesis, 36) NumberPattern2—a pattern ending with one or more digits followed by a comma, 37) NumberPattern3—a pattern starting with a digit, 38) NumberPattern4—a pattern ending with a digit, 39) SpacePattern—a pattern of three groups of characters separated by a single space, 40) NumberLetterPattern—a pattern starting with a single digit, followed by an apostrophe and a hyphen and that ends with one or more lower case letters, 41) NumberHyphenPattern—a pattern that starts with a hyphen, followed by a digit, a period and one or more digits, 42) YearPattern—a pattern starting with a 1 or 2, followed by either a 9 or 0, followed by any 2 digits, 43) ListPattern—a pattern that starts with an open parenthesis, followed by one or more groups of one or more digits and a comma, followed by a digit and a closing parenthesis, 44) NHyphenPattern—a pattern that starts with a capital N, followed by a hyphen and ending with an arbitrary set of characters, and 45) SuffixPattern—a pattern that ends with one of the following sequences: xy, ene, ine, yl, ane, oic.

The foregoing patterns are employed by the algorithm, as will be described below in reference to FIGS. 1 and 3.

A document is first analyzed by the tokenizer 702 that splits the stream of characters into tokens. A token is therefore defined as a string of characters without blank spaces. Such a tokenizer 702 can be, for example, one that is part of the Java™ language. It is assumed that the document is represented by a vector of tokens that forms the input to the token processing unit 705.

Figures 1, 1A, 2:
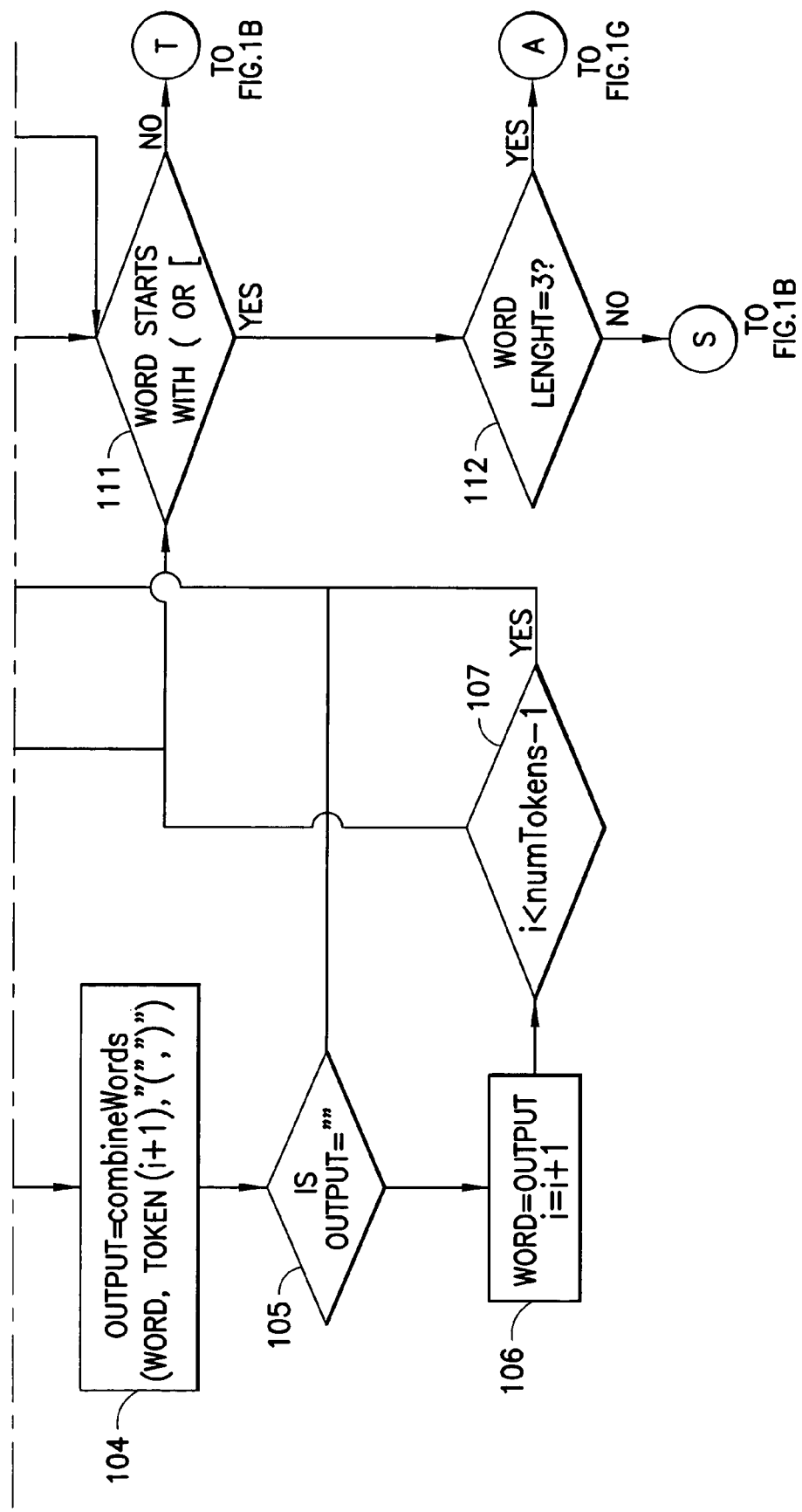
FIGS. 1-6 are each a logic flow diagram where.
Figure 1B:
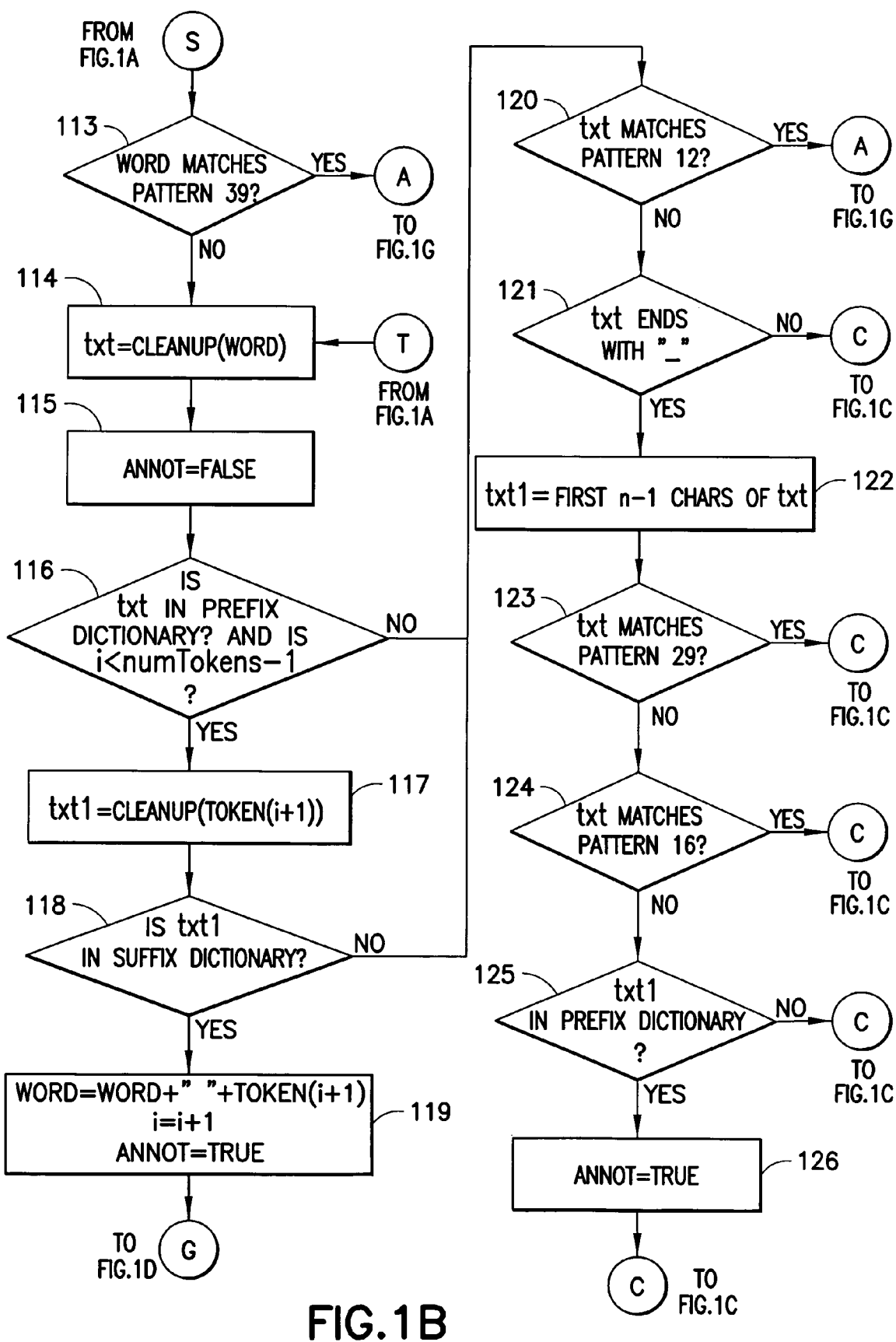
Figure 1C:
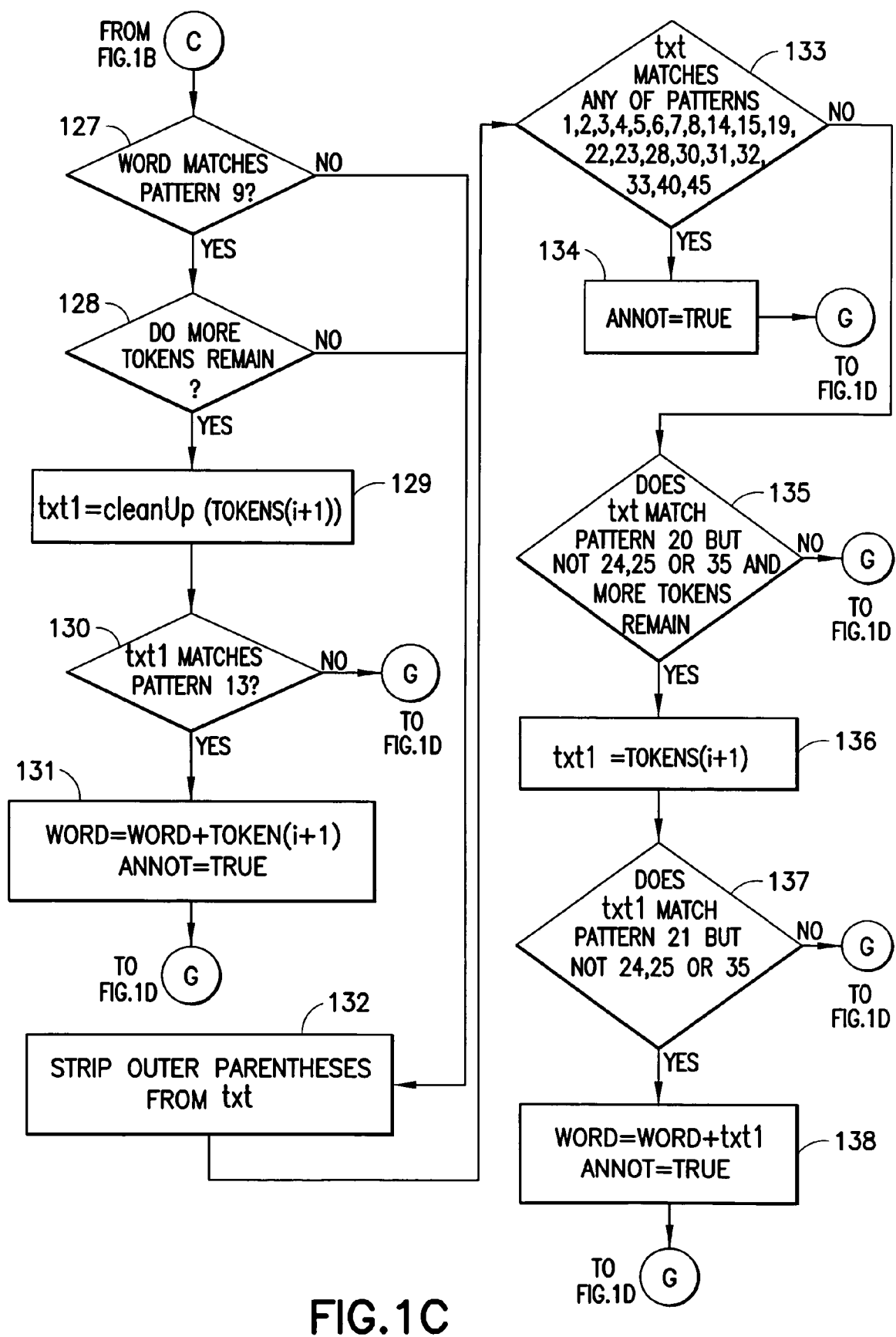
Figure 1D:
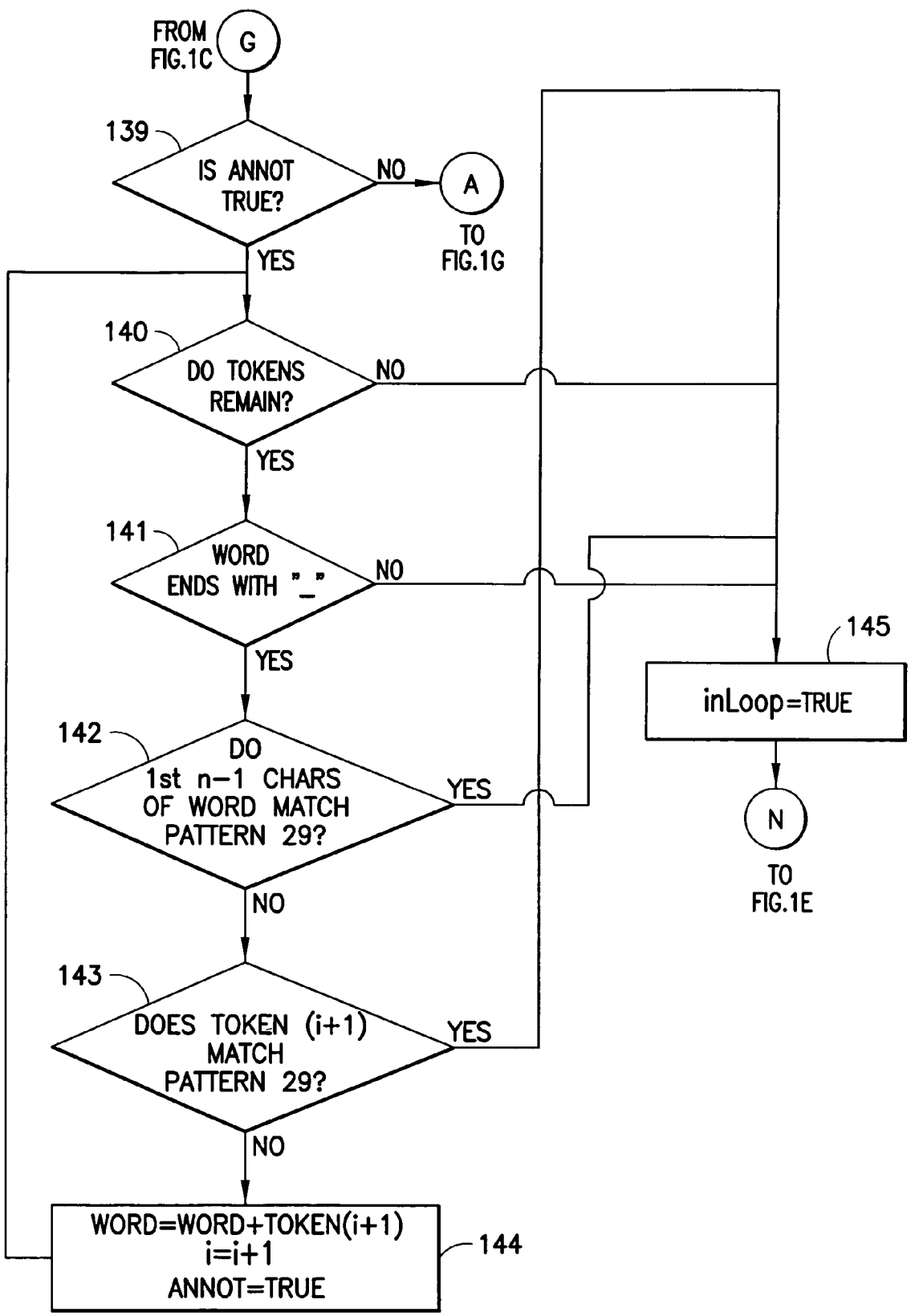
Figure 1E:
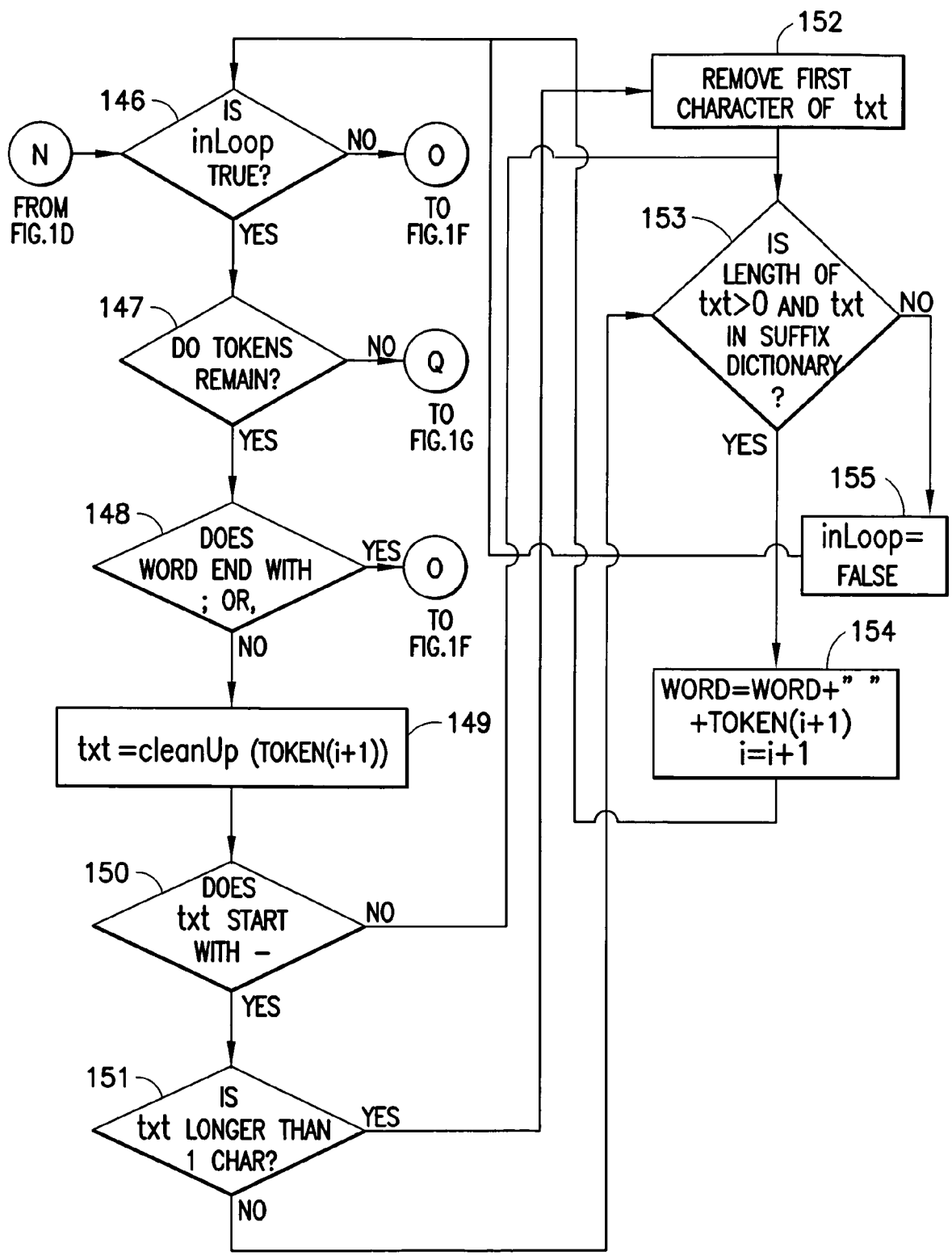
Figure 1F:
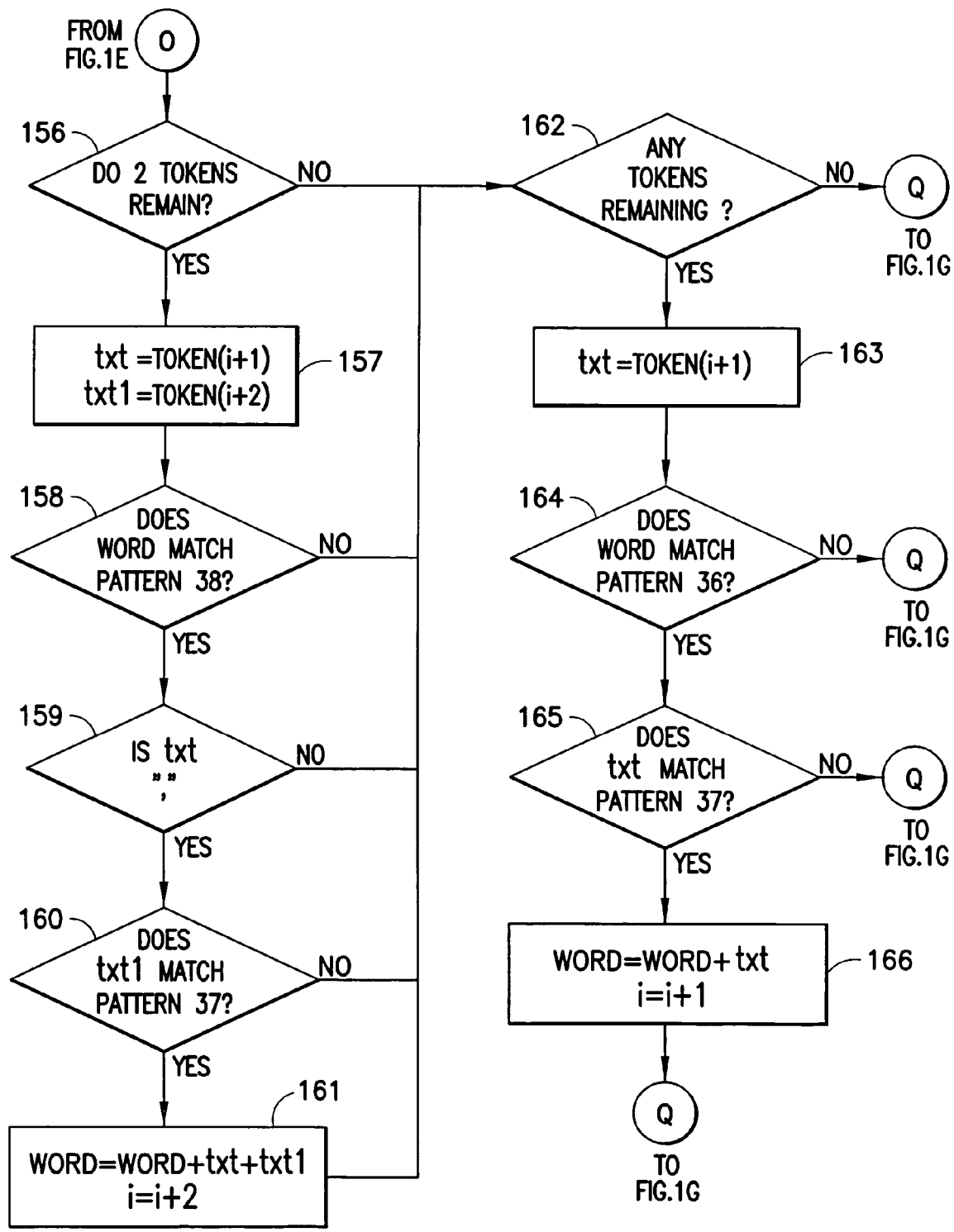
Figure 1G:
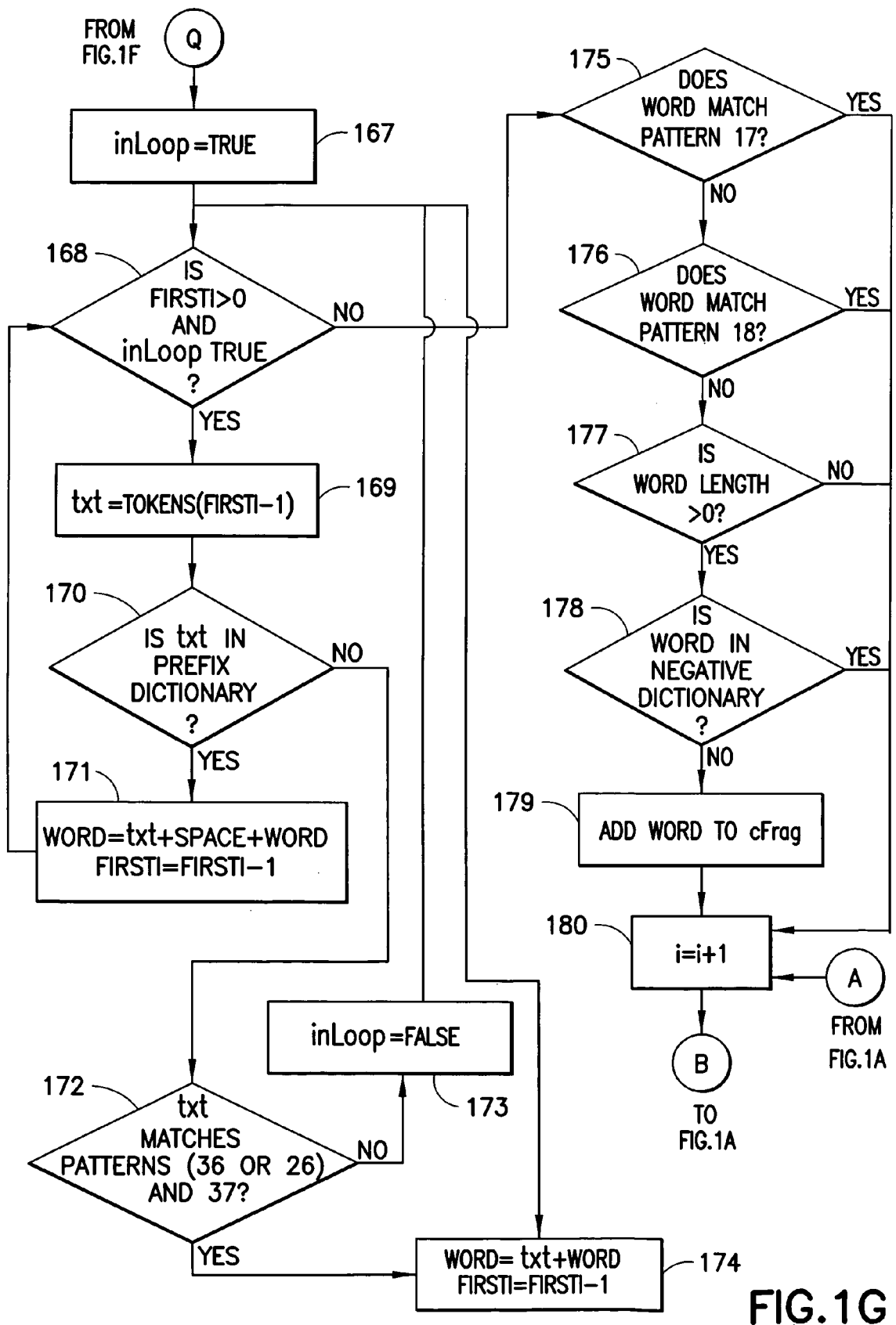
Figure 2:
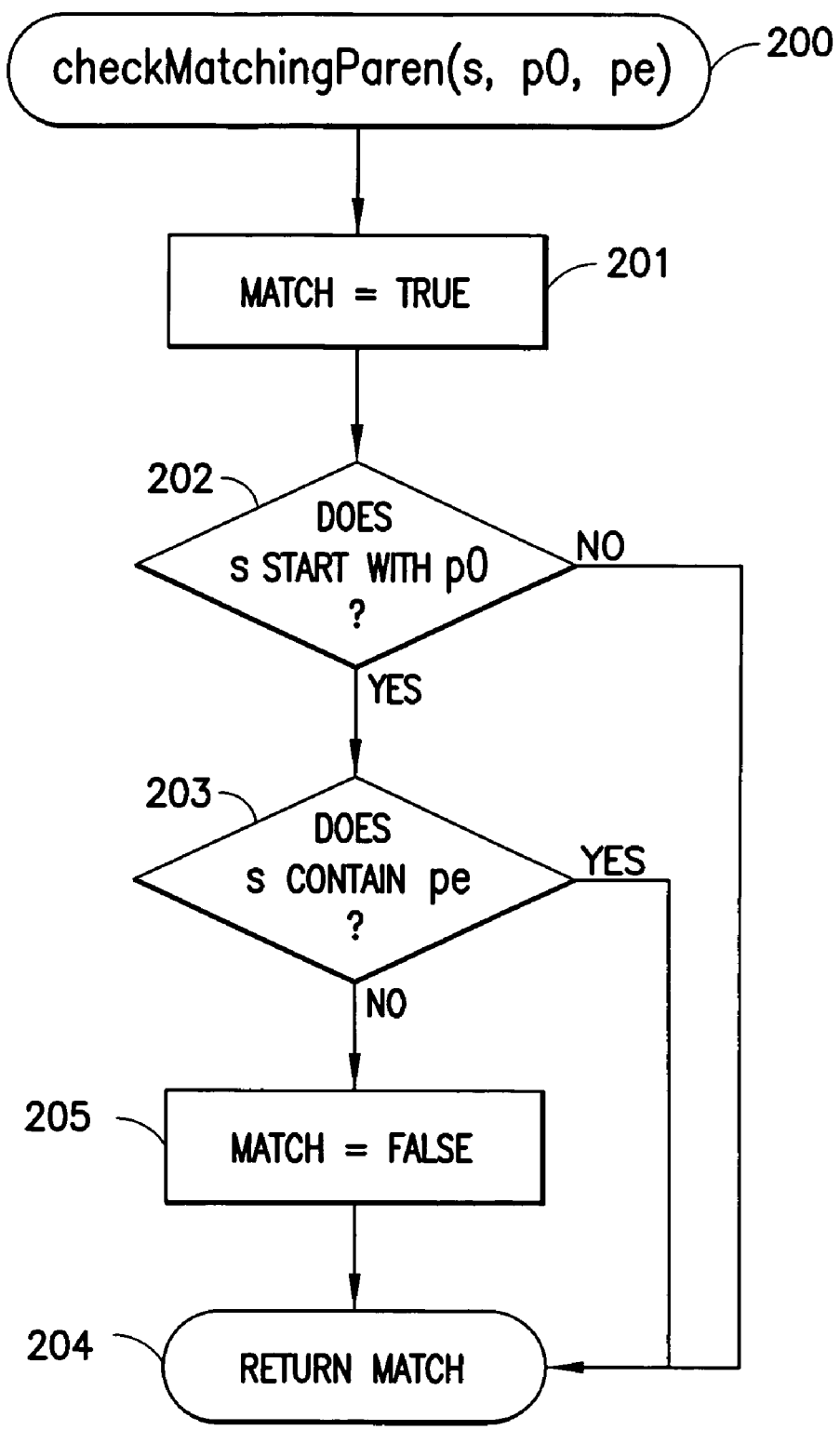

Referring to FIG. 1, in a presently preferred method the input is shown in block 100 as a vector of tokens "tokens". The index into this vector is i, initialized to 0, and numTokens is the size of the vector. In block 101 a determination is made if all tokens have been examined. If so, the method proceeds to block 181 to the combine fragments method described in FIG. 6, also referred to as the Combiner(Vector frag) routine. Otherwise, in block 102 a determination is made whether there is another token after the current token. If the system 700 is examining the last token the method proceeds to block 111. Otherwise, in block 103 the string word is set to the i-th token (tokens(i)) and firstI is set to the current i. In block 104 a combineWords function is called (shown in detail in FIG. 3).

Basically, the combineWords function checks if the current token and the subsequent token have matching parenthesis. The combineWords function returns a string output that is tested in block 105. If the output string is empty the method proceeds to block 108. Otherwise, word is set to the output string, and i is incremented by one in block 106. In block 107 a test is made to determine whether there is another token after the current token (where the current token is defined by the value of i). If there is a subsequent token, combineWords is called again in block 108 to check for matching square brackets, otherwise the method proceeds to block 111. If the output of combineWords invoked in block 108 is not an empty string (tested in block 109), word is set to the output of combineWords in block 110 and i is incremented before proceeding to block 111. If the output of combineWords is an empty string, the method immediately proceeds to block 111. In block 111 a determination is made whether the word starts with an open or square parenthesis. If not, the method proceeds to block 114. Otherwise the length of the word is checked in block 112. If the length is three the method proceeds to the end of the loop denoted by connector A. Otherwise the word is checked against pattern 39 (i.e., the SpacePattern defined above to be a pattern of three groups of characters separated by a single space). If the word matches pattern 39, the method proceeds to the bottom of the token loop denoted by connector A. If it does not match, the string txt is set to the output of a cleanUp routine, where its input is the word. The cleanUp routine (shown in FIG. 5) basically strips ending punctuation. In block 115 a variable annot is set to false. In block 116 a determination is made whether the string txt is in the prefix dictionary 708, and whether there is another token following the current one. If the test fails, the method proceeds to block 120. Otherwise the string txt1 is the output of cleanUp, where the i+1 token is the input. In block 118 a determination is made whether txt1 is in the suffix dictionary 710. If it is not, the method proceeds to block 120. If txt1 is found in the suffix dictionary 710 the string word is set to the concatenation of the current word, a space and the i+1st token in block 119. Furthermore, i is incremented by one and the variable annot is set to true. The method proceeds to block 139 via connector G.

Assuming that txt1 was not found in the suffix dictionary 710, in block 120 a determination is made whether the string txt matches pattern 12 (i.e., NumberPattern1, the pattern having three groups of digits separated by comma). If it does, the method proceeds to block 180 via connector A, otherwise a determination is made in block 121 whether the text ends with a hyphen. If it does not, the method proceeds at block 127 via connector C. Otherwise in block 122 the string txt1 is set to the first n-1 characters of txt, where n is the length of the string txt. In block 123 a determination is made whether txt1 matches pattern 29 (LetterPattern2, the pattern consisting of all lower case letters). If it does, the method proceeds to block 127 via connector C. Otherwise, a determination is made in block 124 whether txt matches pattern 16. Again if it matches the pattern the method proceeds to block 127. If it does not match, a determination is made whether the string txt1 is in the prefix dictionary. If it is not, the method proceeds to block 127. If txt1 is found in the prefix dictionary 708, the method proceeds to block 126 where annot is set to true before proceeding to block 127.

In block 127 a determination is made whether the string word matches pattern 9 (SingleLetterPattern, the pattern that is either the capitalized letter C or the capitalized letter R). If it does not, the method proceeds to block 132. Otherwise a determination is made whether any tokens remain. If not, the method proceeds to block 132. If there are more tokens, the next token (i+1) is the input to the cleanUp method whose output is set to txt1 in block 129.

In block 130 a determination is made whether txt1 matches pattern 13 (NumberPattern2, the pattern that is either a single or double digit number). If it does not, the method proceeds to block 139 via connector G. Otherwise, the string word is set to the concatenation of the word and the subsequent token in block 131, the variable annot is set to true and the method proceeds to block 139. In block 132 the outermost parenthesis or square brackets are removed from the string txt, if they exist, before proceeding to block 133. In block 133 the string is matched against the following patterns: 1, 2, 3, 4, 5, 6, 7, 8, 14, 15, 19, 22, 23, 28, 30, 31, 32, 33, 40 and 45. If the string txt matches any of these patterns the variable annot is set to true and the method proceeds to block 139. If txt does not match any of the above-enumerated patterns, a determination is made in block 135 whether it matches pattern 20 (PunctPattern7, the pattern containing at least one open parenthesis) and does not match any one of the patterns 24, 25 or 35, and whether subsequent tokens remain. If these tests are negative the program proceeds to block 139 via connector G, otherwise txt1 is set to the subsequent token (token i+1) in block 136. It is then checked in block 137 whether the string txt1 matches pattern 21, but does not match patterns 24, 25 or 35. If the test is negative, the method proceeds to block 139. If the test in block 137 is true, the string word is set to the concatenation of the word and the string txt1, and the variable annot is set to true in block 138 before proceeding to block 139. If the test in block 139 is negative (the variable annot is false) the method proceeds to the end of the loop in block 180. Otherwise, a determination is made in block 140 as to whether any tokens remain. If there are no further tokens, the method proceeds to block 145 where a local variable inLoop is set to true, and from block 145 to block 146 via connector N. If there is at least one further token, a determination is made in block 141 whether the word ends with a hyphen. If the test is negative the method proceeds to block 145, otherwise a determination is made in block 142 whether the first (n-1) characters (where n is the length of the word) match pattern 29 (LetterPattern2, the pattern consisting of all lower case letters). If the test is positive the method proceeds to block 145, otherwise the string word is set to the concatenation of the word and the subsequent token and i is incremented by one in block 144 before proceeding to block 140.

In block 145 the variable inLoop is set to true before proceeding to block 146 where a test is made whether inLoop is true or false (block 146 can also be entered from blocks 150 and 154). If inLoop is false, the method proceeds to block 156 via connector O. If inLoop is true, a determination is made in block 147 whether any tokens remain. If the method has already examined the last token, control passes to block 167 via connector Q. Otherwise, a determination is made in block 148 whether the word ends with a semi-colon ";" or a comma ",". In the case that the word has such an ending the method proceeds to block 156. Otherwise, the string txt is set to the output of cleanUp, where the subsequent token is the input in block 149. In the next block 150 a determination is made whether the string txt starts with a hyphen. It the case that it does not, the method continues at block 153. Otherwise a determination is made (block 151) whether the string txt is longer than one character. If it is, the hyphen (the starting character) is removed from txt in block 152. If txt is only the hyphen character the method continues at block 153 where a determination is made whether the length of txt is larger than zero, and whether txt is in the suffix dictionary 710. If the test is positive, in block 154 the string word is set to the concatenation of the word, a space and the i+1st token, and the method continues at block 146 to re-test the variable inLoop. If the test in block 153 is negative, the variable inLoop is set to false in block 155 and the method proceeds to block 146. In block 156 a determination is made whether at least two more tokens remain to be examined. If this test fails the method proceeds to block 162. Otherwise, the string txt is set to the i+1st token and the string txt1 is set to the i+2nd token in block 157. In block 158 a determination is made whether the word matches pattern 38 (NumberPattern4, the pattern ending with a digit). If it does not match, the method proceeds to block 162. Otherwise a determination is made whether the string txt is a "," in block 159. If it is not the method proceeds to block 162. If it does, a test is made at block 160 as to whether txt1 matches pattern 37 (i.e., NumberPattern3, the pattern starting with a digit). If it does not match, the method proceeds to block 162. If the tests performed at blocks 158, 159 and 160 are all true, then the string word is set to the concatenation of word, txt and txt1 in block 161, where i is also incremented by 2 before proceeding to block 162.

In block 162 a determination is made whether there are any tokens remaining. If not, the method proceeds to block 167 via connector Q. If there are tokens remaining, the method assigns txt to the next token in block 163, and in block 164 a determination is made whether the word matches pattern 36 (NumberPattern2, the pattern ending with one or more digits followed by a comma). If its does not, the method proceeds to block 167, otherwise it continues at block 165 where a determination is made whether txt matches pattern 37 (NumberPattern3). If pattern 37 is not matched by txt, the method proceeds to block 167. If the pattern matches, the string word is set to the concatenation of the word and txt in block 166, where i is also incremented by one before proceeding to block 167.

In block 167, the variable inLoop is reset to true before proceeding to block 168, where a determination is made whether a variable firstI is greater than zero and whether the variable inLoop is true. If this test is positive, the string txt is set to the token preceding the firstI tokens in block 169 before determining in block 170 whether txt is in the prefix dictionary 708. If the test in block 168 is negative the method proceeds to block 175. If the test in block 170 is positive, the string word is set to the concatenation of txt, space and word in block 171, where also firstI is decremented by one. The method then proceeds to block 168. If the test in block 170 is negative, a determination is made in block 172 whether the string txt matches the pattern 37, and also matches either pattern 36 or 26, that is, does:

txt=a pattern starting with a digit, and that ends with one or more digits followed by a comma, or that ends with an open square bracket followed by one or more digits?

If the test in block 172 is positive, the string word is set to the concatenation of txt and word, and the variable firstI is decremented by one in block 174. If the test in block 172 is negative, the variable inLoop is set to false in block 173 before proceeding back to block 168.

When the method reaches block 175 from block 168 (the variable firstI is not greater than zero and/or the variable inLoop is false), it performs a series of tests. The first test in block 175 is whether the word matches pattern 17 (PunctPattern4, the pattern that starts with one or more digits and that ends with a hyphen), and if it does not a test is made in block 176 as to whether word matches pattern 18 (PunctPattern5, the pattern having one or two double hyphenes). If either one of these tests is positive, the method proceeds to block 180. Otherwise, in block 177 a determination is made whether the word length is larger than zero. If not, the method proceeds to block 180. Otherwise, a test is made in block 178 whether the word is in the negative dictionary 712. If the word is found in the negative dictionary 712, the method proceeds to block 180, otherwise the word is added to a vector of chemical fragments (cFrag) in block 179. It should be noted that a vector is the preferred embodiment of this structure, but other structures to hold the recognized chemical fragments can be employed as well. The method then continues at block 180 where i is incremented by one before proceeding to the beginning of the loop in block 101.

Figure 3:
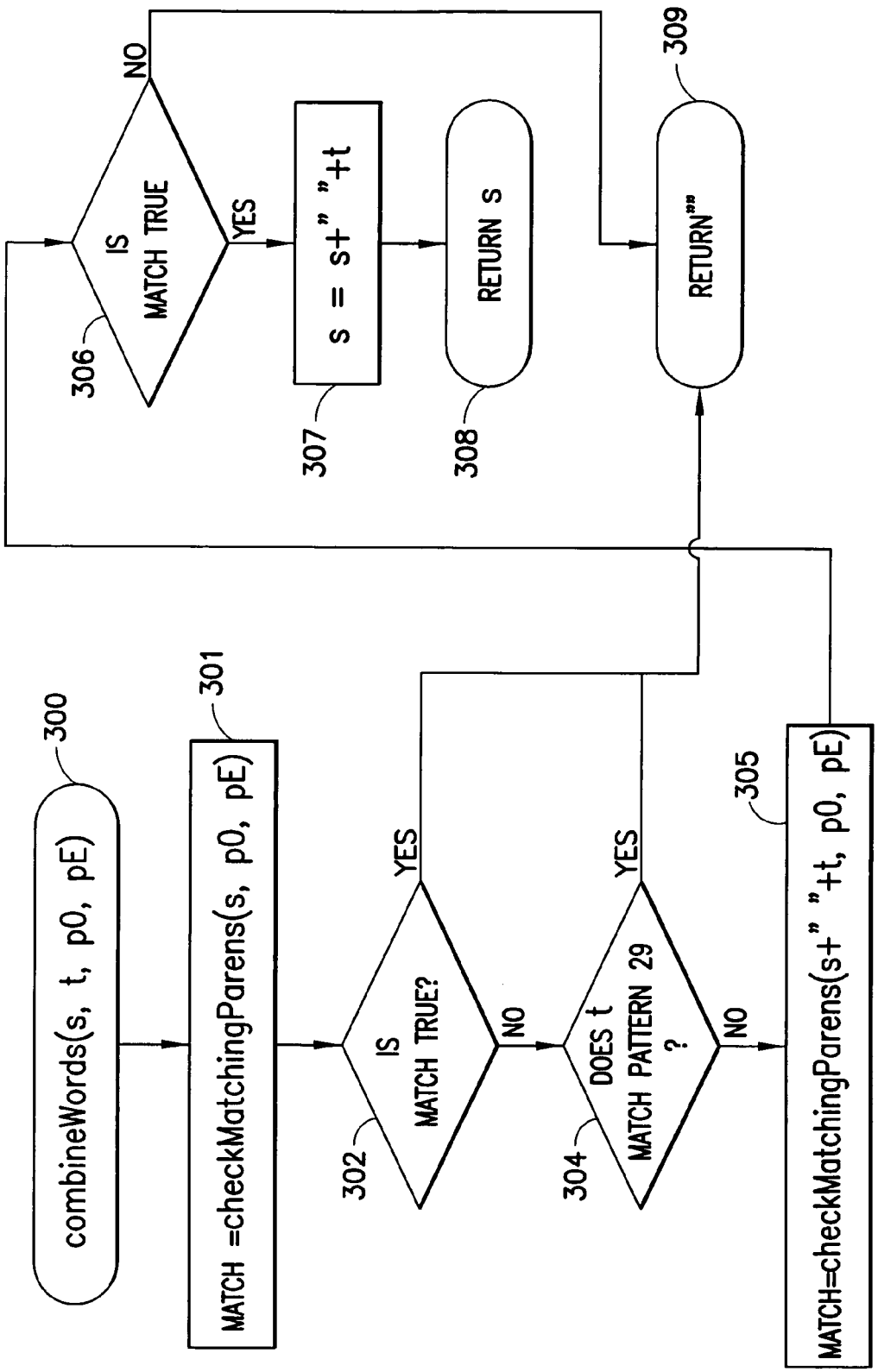

FIG. 3 illustrates the combineWords routine that is used in FIG. 1. This method takes four strings as input: s, t, pO and pE. The strings s and t are characterStrings and pO and pE can be interpreted as matching parenthesis (brackets). The inputs are shown in block 300. In block 301 a routine checkMatchingParens (described in FIG. 2) is invoked to test whether the string s has matching open and closed parenthesis (brackets). The result "match" is examined in 302. If match is true, the method exits in block 309, returning an empty string. If match is false, the string t is matched against pattern 20 (PunctPattern7, the pattern containing at least one open parenthesis) in block 304. If a match is found, the method exits in block 309 with an empty string. Otherwise, in block 305, checkMatchingParens is invoked in block 305 with the concatenation of the strings s, an empty space and t as first input. The output "match" is examined in block 306. If match is false, the method returns an empty string in block 309. If match is true, the routine concatenates the string s, and empty space and the string t in block 307 and returns this new string in block 308.

FIG. 2 shows the preferred embodiment of the checkMatchingParens function that is used in the combineWords function described above in reference to FIG. 3. The input to the function checkMatchingParens is three strings (s, po, pe), where the first string may be interpreted as a character string, and the second and third strings as a set of matching parenthesis. The method returns false when the string has only an opening parenthesis and no closing one. Otherwise, true is returned. In block 201 the variable "match" is set to true. In block 202 a determination is made whether input string s begins with the string po. If it does not, the function returns the value of match (false) in block 204. Otherwise, a determination is made in block 203 whether the string s contains the string pE. If it does not match (true) is returned in block 204. Otherwise, match is set to false in block 205, and this value is returned in block 204.

Figure 4:
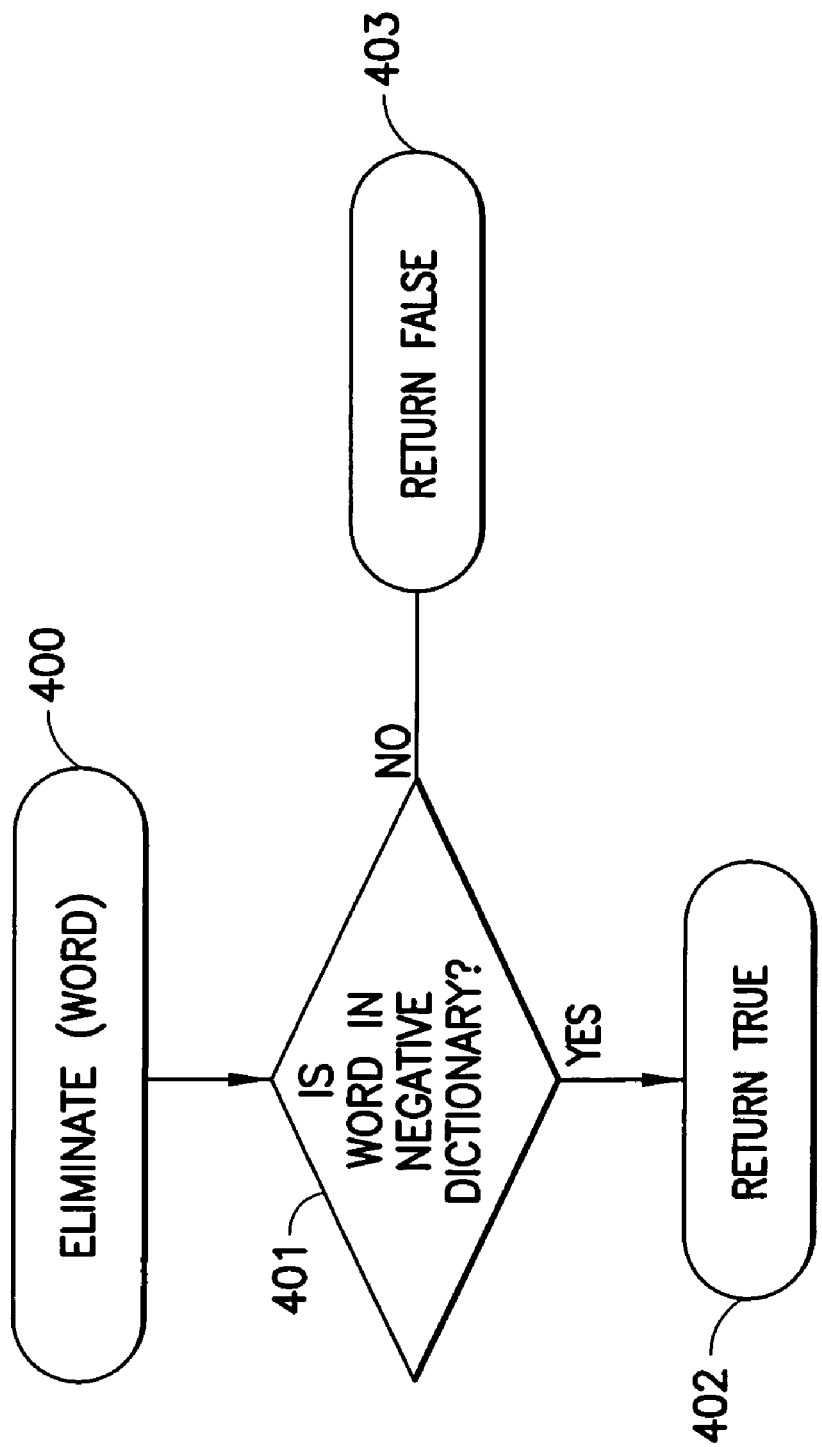

FIG. 4 shows a preferred embodiment of a word eliminate method. The input is a string "word" as shown in block 400. In block 401 a determination is made whether the word is in the negative dictionary 712. If it can be found there, false is returned in block 403. If the word is not in the negative dictionary 712, true is returned in block 302.

Figure 5:
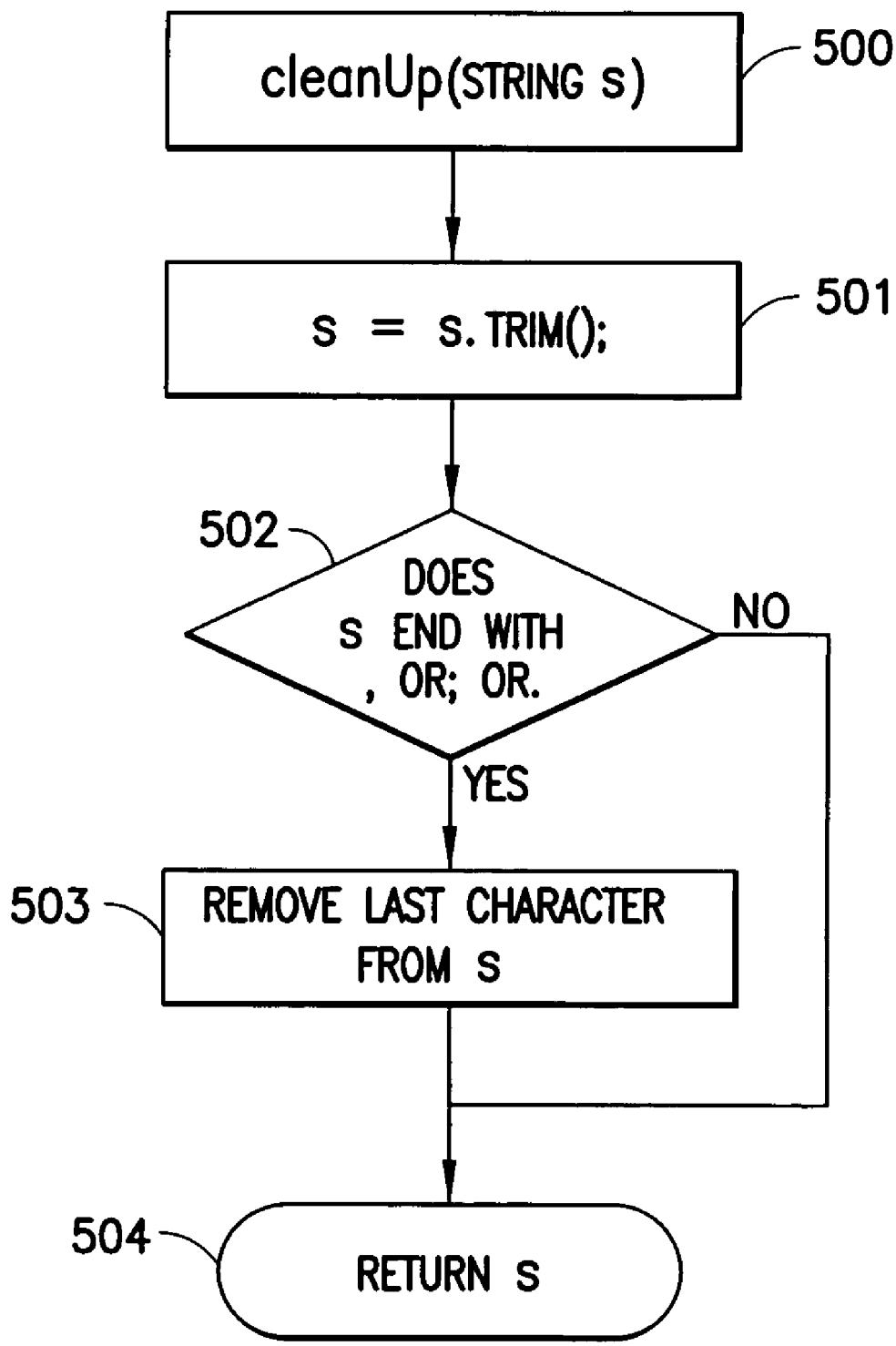

FIG. 5 shows a preferred embodiment of the cleanUp routine that was referred to several times above. This method takes a string as input and returns a string from which some punctuation is stripped. In block 500 the input string s is presented. In block 501 any leading and trailing white space (blank or null characters) is trimmed from s. In block 502 a determination is made whether the string s ends with a ",", a ";", or a ".". If this test is positive, the last character of string s is removed in block 503 before returning the string s in block 504, otherwise the routine returns the string s (with white space removed) in block 504.

Figure 6A:
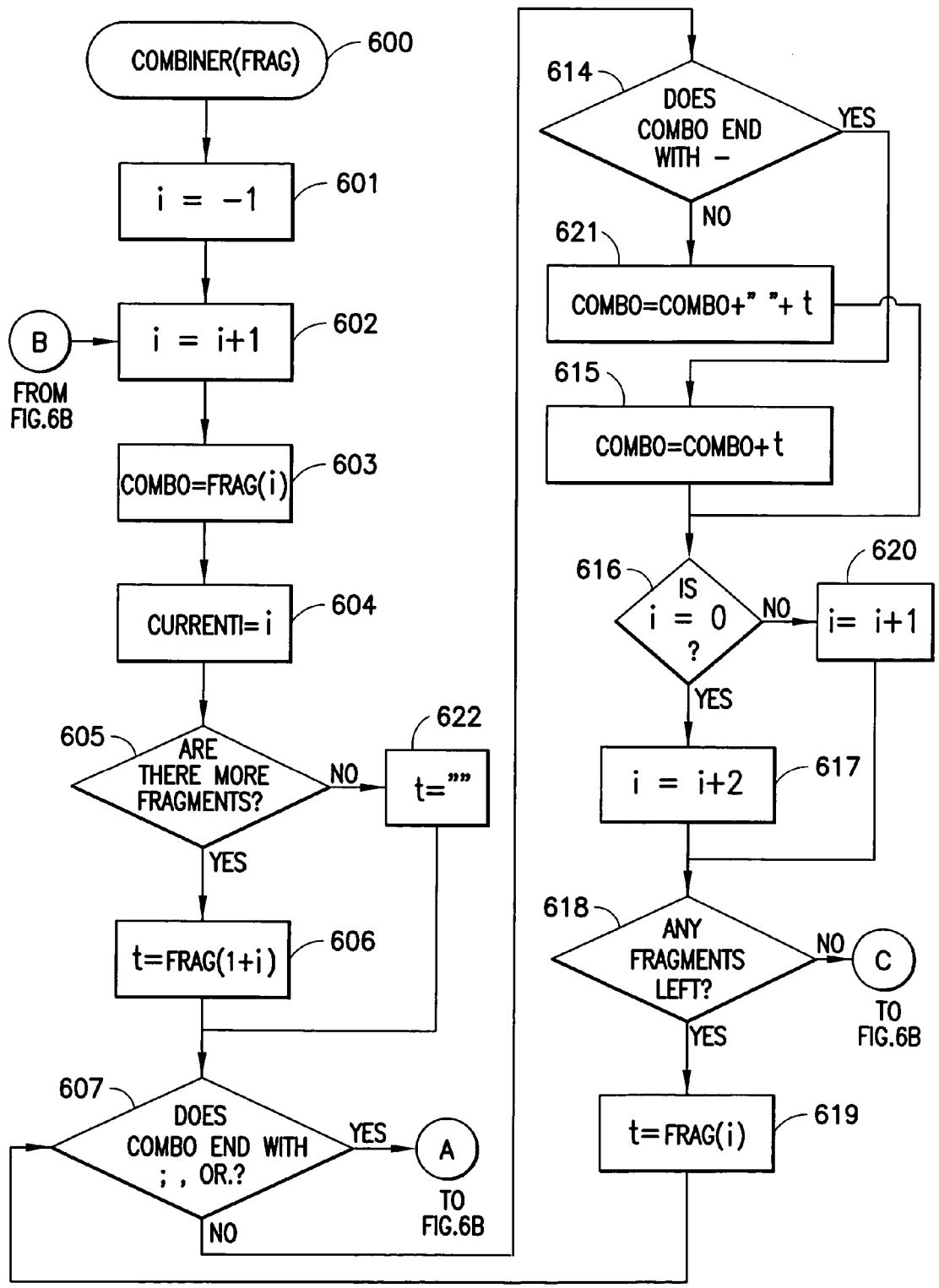
Figure 6B:
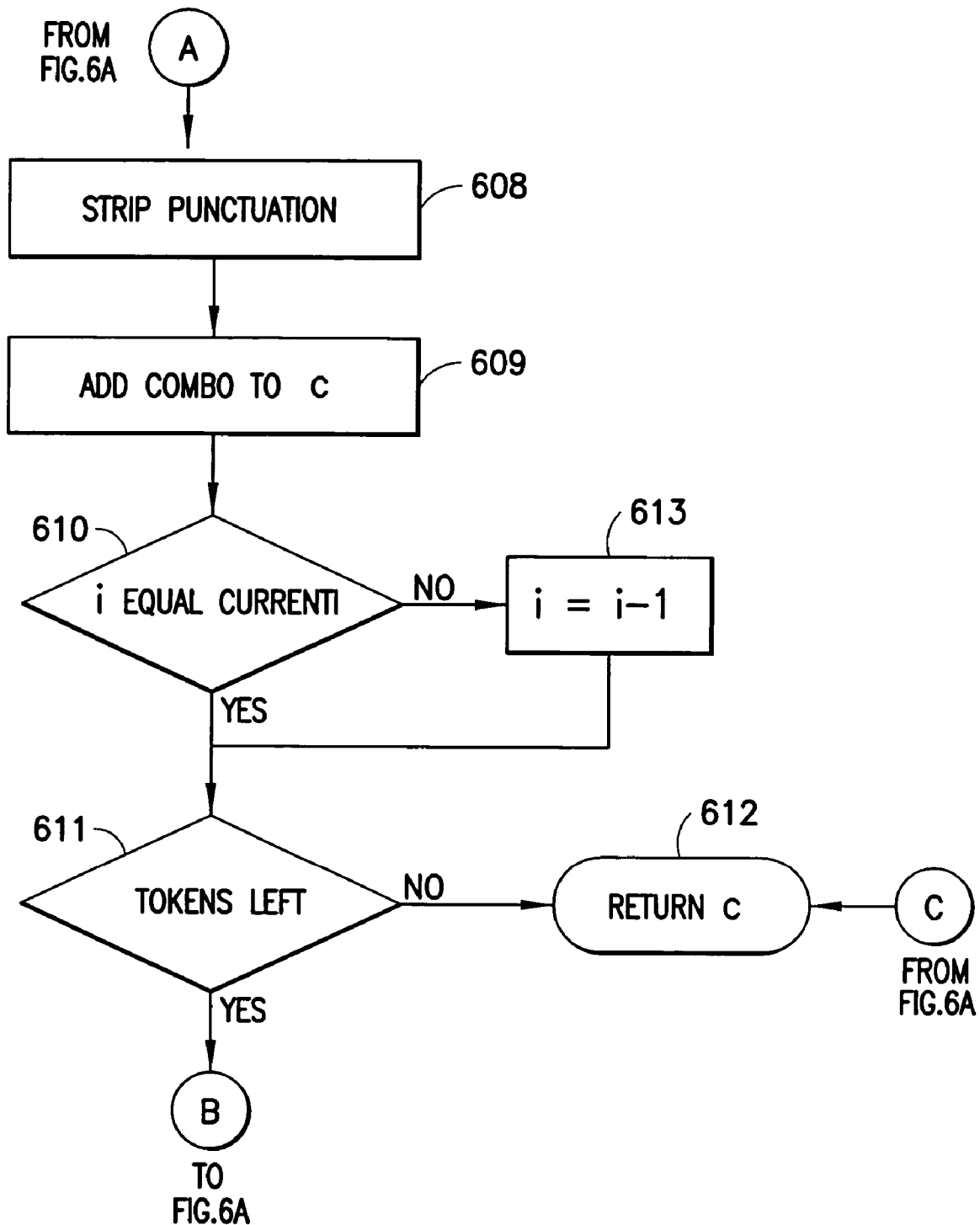

FIG. 6 shows a preferred embodiment of the Combiner (Vector frag) routine. This method takes a vector frag of OffsetTokens as input (e.g., chemical fragments) and determines whether adjacent fragments can be combined to form an even longer (more complete) chemical fragment. An OffsetToken is an object that contains a text string, an integer denoting the starting position of the text in the document and an integer denoting the end position of the text in the document. In block 601, the index variable i is initialized to −1 and in block 602 i is incremented by one. The string combo is set to the text of the i-th entry of the input vector frag in block 603. In block 604 the variable currenti is set to i. In block 605 a determination is made whether the current fragment is the last fragment. If it is, the string t is set to an empty string in block 622 before proceeding to block 607. Otherwise, t is set to the text portion of the next fragment (frag(i+1)) in block 606 before proceeding to block 607. In block 607 a determination is made whether the string combo ends with a ",", a ";", or ".", an indication that a sentence (sentence part) boundary has been encountered. If punctuation is present, the method continues in block 608 where the punctuation is stripped from the combo string before proceeding to block 609. The combo string is added to a vector c in block 609, denoting that the longest string has been found. The method proceeds to block 610 where it is determined whether the current index variable currenti is the same as the index variable i. If they are not equal, the index variable i is decremented by one in block 613 before proceeding to block 611. If i has the same value as currenti the method proceeds to block 611 where a determination is made whether there are any remaining tokens. If there are no remaining tokens the method returns the vector c in block 612, otherwise the method proceeds to block 602. If the test in block 607 is negative, the method determines in block 614 whether the string combo ends with a hyphen. If the test is negative, the string combo is set to the concatenation of combo, an empty space and the string t in block 621, before proceeding to block 616. If the test in 614 is positive, the method specifies that the string combo is set to the concatenation of combo and t in block 621 before proceeding to block 616. In block 616 a test is made to determine whether i is zero. This is intended for special processing for the beginning of the loop. In case that i is zero, i is incremented by two in block 617, otherwise it is incremented by one in block 620. After the appropriate incrementing of i, the method proceeds to block 618 where a determination is made as to whether there are any remaining fragments. If there are no remaining fragments the method exits in block 612, returning the vector c. Otherwise, the string t is set to the text portion of the i-th element of frag in block 619 before continuing to block 602 via connector B.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. For example, more or less than the number of patterns described above may be used, and the various rules governing their use, as reflected in the logic flow diagrams of FIGS. 1 and 3, can be employed. However, all such and similar modifications of the teachings of this invention will still fall within the scope of this invention.

It should be further appreciated that the system 700 could be implemented in a network environment, and that components of the system 700 may be distributed across multiple computers. The network environment may contain two or more computers connected by a local or a wide area network, (e.g., Ethernet, Token Ring, the telephone network, and the Internet), and a user may access a hypermedia or other object database using a client application on the user's computer. The client application may communicate with a search server (e.g., a hypermedia object database search system) located on a client computer or another computer (e.g., one or more servers) on the network. To process queries from users, the search server may access a database index, which may be located on the same computer as the search server or on another computer on the network. The document objects in a database may be located on any computer on the network. In this invention certain of the functional units and modules shown in FIG. 7, such as the token processing unit 705 and components of the token processing unit 705, may be located on two or more computers, and may be coupled together by one or more data communications networks. One or more of the connections between the tokenizer 702 and the token processing unit 705, and/or the token processing unit 705 and the sentence parser 714, may also be implemented over data communications networks, including local and wide area networks, such as the Internet. The input to the tokenizer 702 and an output from the sentence parser 714 may also be implemented using one or more networks. The user may query the system 700 over a network, such as the Internet, and the system 700 may form a part of a network-based, e.g., a Web-based, service such as, by example only, a data mining type of service.

Further, while the method and apparatus described herein are provided with a certain degree of specificity, the present invention could be implemented with either greater or lesser specificity, depending on the needs of the user.

Further still, some of the features of the present invention could be used to advantage without the corresponding use of other features. As such, the foregoing description should be considered as merely illustrative of the principles of the present invention, and not in limitation thereof.

What is claimed is:

1. A method to process a document, comprising:
 partitioning, with a tokenizer operating on at least one computer, document text separated by spaces into a plurality of tokens based on the spaces;
 identifying, with a token processing unit operating on at least one computer, tokens to be ignored and not considered;
 determining, with the token processing unit, that a first token considered of the plurality of tokens comprises a chemical name fragment, wherein determining comprises:
  examining syntax of the first token,
  examining context of the first token with respect to at least one adjacent token of the plurality of tokens, and
  taking into account the syntax and the context, applying to the first token a plurality of regular expressions, rules, and a plurality of dictionaries comprised of a prefix dictionary, and a suffix dictionary to recognize the chemical name fragments;
 adding, with the token processing unit, the recognized chemical name fragment to a vector of chemical name fragments, where the chemical name fragment is identified by a vector index variable;
 combining, with the token processing unit, the recognized chemical name fragment with at least one of the adjacent tokens that are determined to be a chemical name fragment into a complete chemical name, where combining comprises:
  initializing the chemical name fragment vector index variable,
  incrementing the chemical name fragment vector index variable, where the incrementing continues at least until no chemical name fragments remain;
  setting a string combination to include the chemical name fragments identified by the initialized and incremented chemical name fragment vector index variables, and
  adding the string combination to a vector c as the complete chemical name;
 assigning, with a sentence parser unit operating on at least one computer, the complete chemical name with one part of speech; and
 storing in a memory the complete chemical name assigned with the one part of speech.

2. A method as in claim 1, where the complete chemical name is assigned a noun phrase part of speech.

3. A method as in claim 1, further comprising filtering recognized chemical name fragments using a list of stop words to eliminate erroneous chemical name fragments.

4. A method as in claim 1, where chemical name fragments are further recognized by using common chemical word endings.

5. A method as in claim 1, where application of said regular expressions and rules results in punctuation characters being one of maintained or removed between chemical name fragments as a function of context.

6. A method as in claim 1, where said regular expressions comprise a plurality of patterns, individual ones of which are comprised of at least one of characters, numbers and punctuation.

7. A method as in claim 6, where the punctuation comprises at least one of parenthesis, square bracket, hyphen, colon and semi-colon.

8. A method as in claim 6, where the characters comprise upper case C, O, R, N and H, and where the characters comprise strings of lower case xy, ene, ine, yl, ane and oic.

9. A method as in claim 1, where identifying tokens to be ignored comprises applying a negative dictionary to the plurality of tokens and wherein the plurality of dictionaries consists of the prefix dictionary, the suffix dictionary, and the negative dictionary.

10. A method as in claim 1, comprising an initial step of tokenizing the document to provide a sequence of tokens.

11. A system for processing a text document, comprising:
 a first unit for partitioning document text separated by spaces into a plurality of tokens based on the spaces;
 a second unit, operable for identifying tokens to be ignored and not considered;
 a third unit, operable for determining that a first token considered of the plurality of tokens comprises a chemical name fragment, wherein determining comprises:
  examining context of the first token with respect to at least one adjacent token of the plurality of tokens, and
  taking into account the syntax and the context, applying to the first token a plurality of regular expressions, rules and a plurality of dictionaries comprised of a prefix dictionary and a suffix dictionary to recognize the chemical name fragment;
 a fourth unit operable, to add the recognized chemical name fragment to a vector of chemical name fragments, where the chemical name fragment is identified by a vector index variable;
 a fifth unit operable, to combine the recognized chemical name fragment with at least one of the adjacent tokens that are determined to be a chemical name fragment, wherein:
  the fifth unit is operable to initialize the chemical name fragment vector index variable, the fifth unit is operable to increment the chemical name fragment vector index variable, where the incrementing continues at least until no chemical name fragments remain;

the fifth unit is operable to set a string combination to include the chemical name fragments identified by the initialized and incremented chemical name fragment vector index variables, and the fifth unit is operable to add the string combination to a vector c as the complete chemical name;

a sixth unit operable to assign the complete chemical name with one part of speech; and a seventh unit operable for storing in a memory the complete chemical name assigned with one part of speech.

12. A system as in claim 11, where the complete chemical name is assigned a noun phrase part of speech.

13. A system as in claim 11, where said second unit further comprises a sub-unit for filtering recognized chemical name fragments using a list of stop words to eliminate erroneous chemical name fragments.

14. A system as in claim 11, where chemical name fragments are further recognized by using common chemical word endings.

15. A system as in claim 11, where application of said regular expressions and rules results in punctuation characters being one of maintained or removed between chemical name fragments as a function of context.

16. A system as in claim 11, where said regular expressions comprise a plurality of patterns, individual ones of which are comprised of at least one of characters, numbers and punctuation.

17. A system as in claim 16, where the punctuation comprises at least one of parenthesis, square bracket, hyphen, colon and semi-colon.

18. A system as in claim 16, where the characters comprise upper case C, O, R, N and H, and where the characters comprise strings of lower case xy, ene, ine, yl, ane and oic.

19. A system as in claim 11, where the second unit is operable for identifying the tokens to be ignored by applying a negative dictionary to the plurality of tokens, and wherein the plurality of dictionaries consists of the prefix dictionary, the suffix dictionary, and the negative dictionary.

20. A system as in claim 11, further comprising a tokenizer for tokenizing the document to provide a sequence of tokens.

21. A computer program product comprising a memory that contains software, the software executable to perform operations comprising:

partitioning a document text separated by spaces into a plurality of tokens based on the spaces;

identifying tokens to be ignored and not considered;

determining that a first token considered of the plurality of tokens comprises a chemical name fragment, wherein determining comprises:

examining syntax of the first token, examining context of the first token with respect to at least one adjacent token of the plurality of tokens, and taking into account the syntax and the context, applying a plurality of regular expressions, rules, and a plurality of dictionaries comprising a prefix dictionary, and a suffix dictionary to recognize the chemical name fragment;

adding the recognized chemical name fragment to a vector of chemical name fragments, where the chemical name fragment is identified by a vector index variable;

combining the recognized chemical name fragment with at least one of the adjacent tokens that are determined to be a chemical name fragment into a complete chemical name, where combining comprises:

initializing the chemical name fragment vector index variable, incrementing the chemical name fragment vector index variable, where the incrementing continues at least until no chemical name fragments remain;

setting a string combination to include the chemical name fragments identified by the initialized and incremented chemical name fragment vector index variables, and adding the string combination to a vector c as the complete chemical name;

assigning the complete chemical name with one part of speech; and storing in a memory the complete chemical name with the one part of speech.

22. A computer program product as in claim 21, where the complete chemical name is assigned a noun phrase part of speech.

23. A computer program product as in claim 21, further comprising the software executable to perform an operation of filtering recognized chemical name fragments using a list of stop words to eliminate erroneous fragments.

24. A computer program product as in claim 21, where chemical name fragments are further recognized by using common chemical word endings.

25. A computer program product as in claim 21, where application of said regular expressions and rules results in punctuation characters being one of maintained or removed between chemical name fragments as a function of context.

26. A computer program product as in claim 21, where said regular expressions comprise a plurality of patterns, individual ones of which are comprised of at least one of characters, numbers and punctuation.

27. A computer program product as in claim 26, where the punctuation comprises at least one of parenthesis, square bracket, hyphen, colon and semi-colon, where the characters comprise upper case C, O, R, N and H, and further comprise strings of lower case xy, ene, ine, yl, ane and oic.

28. A computer program product as in claim 21, where said software executable to perform the operation of assigning operates on a sequence of tokens derived from document text, and where identifying tokens to be ignored comprises applying a negative dictionary to the plurality of tokens and wherein the plurality of dictionaries consists of the prefix dictionary, the suffix dictionary, and the negative dictionary.

29. A system comprising a at least one computer, said system comprising a first unit for partitioning document text separated by spaces into a plurality of tokens based on the spaces;

a second unit, operable for identifying tokens to be ignored and not considered;

a third unit, operable for determining that a first token considered of the plurality of tokens comprises a chemical name fragment, wherein determining comprises:

examining syntax of the first token, examining context of the first token with respect to at least one adjacent token of the plurality of tokens, and taking into account the syntax and the context, applying a plurality of regular expressions, rules, and a plurality of dictionaries comprised of a prefix dictionary and a syntax dictionary to recognize the chemical name fragment;

a fourth unit, operable to add the recognized chemical name fragment to a vector of chemical name fragments, where the chemical name fragment is identified by a vector index variable;

a fifth unit, operable to combine the recognized chemical name fragment with at least one of the adjacent tokens that are determined to be a chemical name fragment into a complete chemical name, where combining comprises:

the fifth unit is operable to initialize the chemical name fragment vector index variable, the fifth unit is operable to increment the chemical name fragment vector index variable, where the incrementing continues at least until no chemical name fragments remain;

the fifth unit is operable to set a string combination to include the chemical name fragments identified by the initialized and incremented chemical name fragment vector index variables, and the fifth unit is operable to add the string combination to a vector c as the complete chemical name;

a sixth unit, operable to assign the complete chemical name with one part of speech; and a seventh unit, operable for storing in a memory information the complete chemical name with the one part of speech.

30. A system as in claim 29, where the complete chemical name is assigned a noun phrase part of speech, and where the second unit is operable for identifying the tokens to be ignored by applying a negative dictionary to the plurality of tokens, and wherein the plurality of dictionaries consists of the prefix dictionary, the suffix dictionary, and the negative dictionary.

31. A system as in claim 29, where a user of the system accesses the system through a data communications network.

* * * * *